US008610582B2

(12) United States Patent
Jeon et al.

(10) Patent No.: US 8,610,582 B2
(45) Date of Patent: Dec. 17, 2013

(54) EXERCISE MONITORING APPARATUS, SYSTEM AND CONTROLLING METHOD THEREOF

(75) Inventors: Younghyeog Jeon, Gyeonggi-Do (KR); Beomoh Kim, Seoul (KR); Heejin Park, Seoul (KR); Gyuseog Hong, Chungeheongnam-Do (KR); Seungjin Jang, Gyeonggi-Do (KR); Jeongmee Koh, Seoul (KR); Youngdon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 334 days.

(21) Appl. No.: 12/947,230

(22) Filed: Nov. 16, 2010

(65) Prior Publication Data

US 2012/0119911 A1 May 17, 2012

(51) Int. Cl.
*G08B 23/00* (2006.01)

(52) U.S. Cl.
USPC .................. 340/573.1; 340/539.22; 340/5.32

(58) Field of Classification Search
USPC ........... 340/573.1, 571, 539.12, 539.22, 463, 340/5.32; 482/8
See application file for complete search history.

(56) References Cited

U.S. PATENT DOCUMENTS 7,534,206 B1 * 5/2009 Lovitt et al. .................. 600/300
7,853,428 B2 * 12/2010 Usui et al. .................... 702/160
8,212,136 B2 * 7/2012 Shirai et al. .................... 84/612
2001/0016689 A1 * 8/2001 Heikkila et al. ............. 600/483
2004/0171956 A1 * 9/2004 Babashan .................... 600/509

* cited by examiner

*Primary Examiner* — Daniel Previl
(74) *Attorney, Agent, or Firm* — KED & Associates, LLP

(57) ABSTRACT

An exercise monitoring apparatus capable of allowing a user to conveniently check a progressed exercise state and capable of properly controlling an exercise amount, by comparing a progressed exercise amount measured based on scheduling information received from an external apparatus and acceleration information of the exercise monitoring apparatus, with a goal exercise amount, and by visually providing a comparison result, a system and an exercise monitoring method thereof. The exercise monitoring apparatus comprises a communication unit configured to receive exercise scheduling information from an external apparatus, a sensing unit configured to detect acceleration information of the exercise monitoring apparatus, a controller configured to measure a progressed exercise amount based on the acceleration information, to acquire a goal exercise amount from the exercise scheduling information, to compare the progressed exercise amount with the goal exercise amount, and to generate a notification message indicating a result of the comparison, and an output unit configured to output the notification message.

22 Claims, 13 Drawing Sheets

EXERCISE MONITORING APPARATUS, SYSTEM AND CONTROLLING METHOD THEREOF

BACKGROUND OF THE INVENTION

1. Field of the Invention

The present invention relates to an electronic apparatus, a system and a controlling method thereof, and particularly, to an exercise monitoring apparatus capable of measuring an exercise amount, a system and an exercise monitoring method thereof.

2. Background of the Invention As sensing techniques for measuring information relating to a user's physical activity develop recently, required is a monitoring apparatus capable of conveniently monitoring a user's exercise by using the sensing techniques.

SUMMARY OF THE INVENTION

Therefore, an object of the present invention is to provide an exercise monitoring apparatus capable of allowing a user to conveniently check a progressed exercise status and capable of properly controlling an exercise amount, by comparing a progressed exercise amount measured based on scheduling information received from an external apparatus and acceleration information of the exercise monitoring apparatus, with a goal exercise amount, and then by visually providing a comparison result, a system and an exercise monitoring method thereof.

To achieve these and other advantages and in accordance with the purpose of the present invention, as embodied and broadly described herein, there is provided an exercise monitoring apparatus, comprising: a communication unit configured to receive exercise scheduling information from an external apparatus; a sensing unit configured to detect acceleration information of the exercise monitoring apparatus; a controller configured to measure a progressed exercise amount based on the acceleration information, to acquire a goal exercise amount from the exercise scheduling information, to compare the progressed exercise amount with the goal exercise amount, and to generate a notification message indicating a result of the comparison; and an output unit configured to output the notification message.

The controller may control the output unit to output information on an exercise amount necessary for the progressed exercise amount to reach the goal exercise amount.

The controller may generate guide information including an exercise type and an exercise time based on the information on an exercise amount necessary for the progressed exercise amount to reach the goal exercise amount, and may control the output unit to output the guide information.

The controller may calculate an exercise speed based on the acceleration information. The controller may determine an exercise level based on the exercise speed, and may control the output unit to output the exercise level. The controller may control the output unit to output a message recommending a change of the exercise level when the determined exercise level is constantly maintained for a predetermined time.

The controller may control the output unit to output the generated message when the progressed exercise amount has reached the goal exercise amount completely or by a predetermined ratio.

The controller may generate guide information on an exercise type and an exercise time necessary for the progressed exercise amount to reach the goal exercise amount, and may control the output unit to output the guide information.

The controller may control the communication unit to transmit information on the progressed exercise amount to the external apparatus.

The communication unit may synchronize the exercise scheduling information and the progressed exercise amount, with the external apparatus in a predetermined period.

The goal exercise amount and the progressed exercise amount may comprise the number of steps, an exercise distance, an exercise time and a calorie-consumption.

The sensing unit may include at least one acceleration sensor or gyro sensor.

The exercise monitoring apparatus may be mounted to a human's body or clothes.

The output unit may output the generated message in a visual manner, in an audible manner, or in a tactile manner.

To achieve these and other advantages and in accordance with the purpose of the present invention, as embodied and broadly described herein, there is also provided a controlling method of an exercise monitoring apparatus, the method comprising: receiving exercise scheduling information from an external apparatus; detecting acceleration information of the exercise monitoring apparatus, and measuring a progressed exercise amount based on the acceleration information; acquiring a goal exercise amount from the exercise scheduling information, comparing the progressed exercise amount with the goal exercise amount, and generating a notification message indicating a result of the comparison; and outputting the notification message.

To achieve these and other advantages and in accordance with the purpose of the present invention, as embodied and broadly described herein, there is still also provided an exercise monitoring system, comprising: a first apparatus; and a second apparatus, wherein the first apparatus comprises: a storage unit configured to store exercise scheduling information; and a communication unit configured to transmit the exercise scheduling information to the second apparatus, and wherein the second apparatus comprises: a communication unit configured to receive exercise scheduling information from the first apparatus; a sensing unit configured to detect acceleration information of the second apparatus; a controller configured to measure a progressed exercise amount based on the acceleration information, to acquire a goal exercise amount from the exercise scheduling information, to compare the progressed exercise amount with the goal exercise amount, and to generate a notification message indicating a result of the comparison; and an output unit configured to output the notification message.

The present invention may have the following advantages.

Firstly, the exercise monitoring apparatus may provide, in a timely way, a comparison result between a goal exercise amount acquired from exercise scheduling information received from an external apparatus, and a progressed exercise amount measured by itself. This may allow a user to visually check a progressed degree of exercise, or to control an exercise speed according to the checked progressed degree. This may also allow the user to have motivation for exercise, and may eliminate dangerous factors due to excessive exercise. Accordingly, the user may manage and monitor exercise more systematically.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 12 to 14 are conceptual views showing examples to mount the portable electronic apparatus 200 according to one embodiment of the present invention.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

The terms of the present specification are used to easily explain the present invention. Accordingly, the present invention is not limited to the terms used in the present specification.

The suffixes attached to components disclosed in the following description, such as 'module' and 'unit or portion' were used for facilitation of the detailed description of the present invention. Therefore, the suffixes do not have different meanings from each other.

The term of 'exercise amount' used in the present specification indicates a numerical value of a user's exercise degree. For instance, the exercise amount may indicate the number of steps, an exercise distance, an exercise time, a calorie-consumption, etc. The term of 'goal exercise amount' indicates an exercise amount to be implemented by a user for a unit time. For instance, the goal exercise amount may indicate the number of steps, or an exercise distance, or an exercise time, or a calorie-consumption, etc. for one day. And, the term of 'progressed exercise amount' indicates an exercise amount implemented by a user from a starting time point to a specific time point. For instance, the progressed exercise amount may indicate the number of steps, an exercise distance, an exercise time, or a calorie-consumption, from '0 o'clock' to the current time.

The term of 'exercise scheduling information' indicates information on a plan of a goal (target) exercise amount set for a specific time. This exercise scheduling information may include unit time information, and information on a goal exercise amount corresponding to the unit time information. This exercise scheduling information may be set by a user or a user's trainer.

Hereinafter, preferred embodiments of the present invention will be explained in more detail with reference to the attached drawings.

Figure 1:
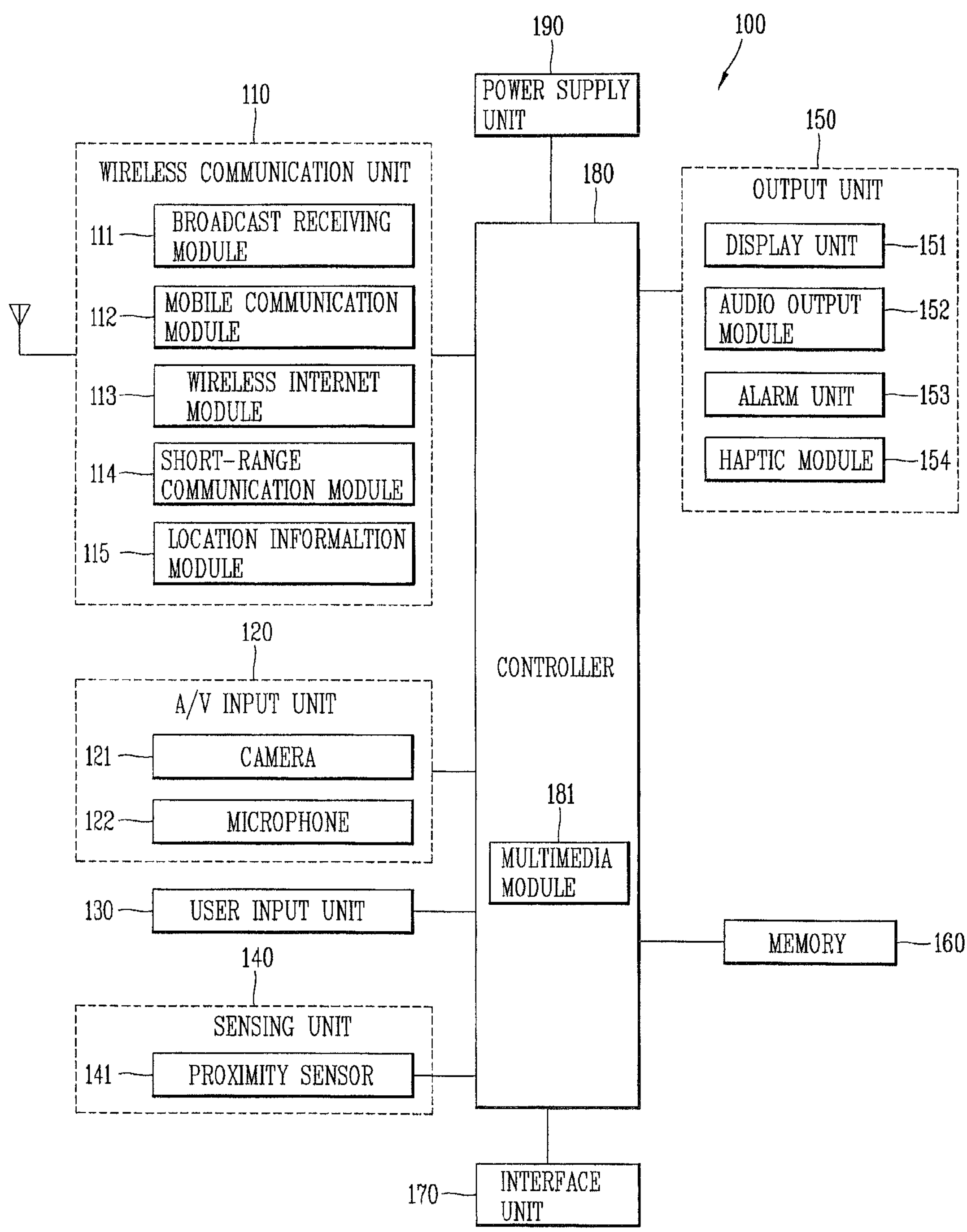
FIG. 1 is a block diagram showing a configuration of a mobile terminal 100 to which embodiments of the present invention may be applied.

FIG. 1 illustrates an example configuration of a mobile terminal 100 according to embodiments of the present invention.

The mobile terminal 100 may be implemented in various forms such as mobile phones, smart phones, notebook computers, digital broadcast terminals, PDAs (Personal Digital Assistants), PMPs (Portable Multimedia Player), etc. However, it will be obvious to those skilled in the art that the present invention may be also applicable to the fixed terminal such as a digital TV and a desktop computer, except for specific configurations for mobility.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, a location information module 115, etc.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal (when the mobile terminal is located in a vehicle, the location of the vehicle can be checked). For example, the location information module 115 may include a GPS (Global positioning system) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. Also, the sensing unit 140 may further include a motion sensor (not shown).

The proximity sensor 141 is configured to detect, without any mechanical contact, whether there exists any object approaching to the mobile terminal 100, or any nearby object. The proximity sensor 141 may detect a nearby object by using a change of an alternating current magnetic field or a static magnetic field, or by using a change ratio of a capacitance. The proximity sensor 141 may be implemented in two or more according to a configuration aspect.

The motion sensor is configured to detect the position or motions of the mobile terminal 100 by using an acceleration sensor, a gyro sensor, etc. The acceleration sensor is a device for converting an acceleration change in one direction to an electric signal, which is being widely used as techniques of MEMS (micro-electromechanical systems) develop. The acceleration sensor may be categorized into various types. For instance, the acceleration sensor includes a sensor mounted in an airbag system of a vehicle and configured to detect collisions to measure a large acceleration, and a sensor used as input means for games and configured to measure a minute acceleration by recognizing minute motions of a user's hand. The acceleration sensor is configured by mounting two axes or three axes in one package. In some cases, the acceleration sensor may require only one Z-axis. Accordingly, when using an acceleration sensor in an X-axis direction or a Y-axis direction rather than in a Z-axis direction, the acceleration sensor may be upright mounted on a main board by using another circuit board. The gyro sensor may be configured to measure an angular speed of the mobile terminal 100.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile terminal 100 may include two or more display units 151 according to an implementation method thereof. For example, the mobile terminal 100 may include a plurality of display units integrally or separately disposed on one surface, or a plurality of display units disposed on different surfaces.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may have, for example, the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile is terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

Recognition of the pointer located to be close to the touch screen without being in contact with the touch screen will be called a 'proximity touch', while recognition of actual contacting of a pointer on the touch screen will be called a 'contact touch'. In this case, when the pointer is in the state of the proximity touch, it means that the pointer is located to correspond vertically to the touch screen.

The proximity sensor 141 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, etc.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store programs used for the processing and controlling operations performed by the controller 180, or may temporarily store data (e.g., a phonebook, messages, still images, video, etc.) that is inputted or outputted. The memory 160 may store data relating to various types of vibrations and sounds outputted when touch input is performed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images.

The power supply unit 190 receives external power or internal power and supplies appropriate power required for operating respective elements and components under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

Figure 2:
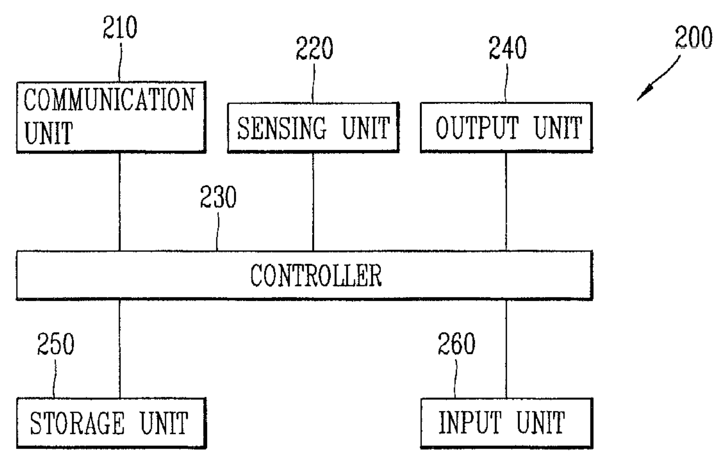
FIG. 2 is a block diagram of a portable electronic apparatus 200 to which embodiments of the present invention may be applied.

FIG. 2 is a block diagram of a portable electronic apparatus 200 to which embodiments of the present invention may be applied.

As shown in FIG. 2, the portable electronic apparatus 200 may comprise a communication unit 210, a sensing unit 220, a controller 230, an output unit 240, a storage unit 250 and an input unit 260. The portable electronic apparatus 200 may further comprise an interface unit (not shown), a power supply unit (not shown), etc.

The communication unit 210 may serve to enable the portable electronic apparatus 200 to perform communications with an external apparatus. For instance, the communication unit 210 may receive exercise scheduling information from an external apparatus, and transmit information on a progressed exercise amount to the external apparatus. The communication unit 210 may transmit or receive the information periodically, or according to a request from the portable electronic apparatus 200 or the external apparatus.

The communication unit 210 is provided with an Ethernet terminal, etc. to connect the portable electronic apparatus 200 with the external apparatus by a wired network. Alternatively, the communication unit 210 may connect the portable electronic apparatus 200 with the external apparatus by WLAN (Wireless LAN)(Wi-Fi), Wibro (Wireless broadband), Wimax (World Interoperability for Microwave Access), HSDPA (High Speed Downlink Packet Access), etc.

The sensing unit 220 detects a state of the portable electronic apparatus 200 or a user, and generates a sensing signal based on information on the detected state. For this, the portable electronic apparatus 200 may be mounted to a user's body or clothes. The sensing unit 220 may include at least one acceleration sensor. Also, the sensing unit 220 may further include a gyro sensor or an earth magnetic field sensor.

The acceleration sensor serves to convert an acceleration change in one direction into an electric signal. Generally, the acceleration sensor may be configured to convert acceleration changes in three axes directions by motions of the portable electronic apparatus 200 to each electric signal, and to measure an acceleration in each direction.

The gyro sensor is a device for measuring an angular speed of the portable electronic apparatus 200 which performs a rotation motion, which may detect a rotated angle with respect to each reference direction. For instance, the gyro sensor may detect each rotation angle based on three axes, i.e., yaw, pitch and roll angles.

The earth magnetic field sensor may detect an azimuth of the portable electronic apparatus 200 based on information on a magnetic field horizontally formed on the surface of the earth.

The controller 230 controls an entire operation of the portable electronic apparatus 200. For instance, the controller

230 measures a motion amount, compares a measured exercise amount with a goal (target) exercise amount, and generates a notification message indicating a comparison result.

The output unit 240 serves to output an audio signal or a video signal or an alarm signal. This output unit 240 may include a display unit (not shown), a voice output unit (not shown), an alarm unit (not shown), a haptic module (not shown), etc.

The storage unit 250 may store programs to operate the controller 230, or may temporarily store data to be input or output (e.g., data on an exercise amount).

The input unit 260 generates input data by which a user controls the operation of the portable electronic apparatus 200. The input unit 260 may be implemented as a key pad, a dome switch, a touch pad (e.g., static pressure/capacitance), a jog wheel, a jog switch, etc. Especially, when a touch pad has a layered structure with a display unit, this is called as 'touch screen'.

The interface unit serves as an interface with all external devices connected to the portable electronic apparatus 200. The interface unit may support communication standards such as USB (Universal Serial Bus), Bluetooth, IEEE1394 (Firewire), RFID (Radio Frequency Identification), IrDA, (infrared Data Association), UWB (Ultra Wideband), ZigBee, and DLNA (Digital Living Network Alliance).

The power supply unit supplies power necessary to operate each component by receiving external power or internal power under control of the controller 230. The power may be supplied to each component from a battery, or an impact power of the portable electronic apparatus 200.

According to one embodiment of the present invention, the communication unit 210 may receive exercise scheduling information from an external apparatus. The exercise scheduling information may include a goal exercise amount to be performed by a user for a unit time such as one day, one week, one month and one year. For instance, the exercise scheduling information may include a goal exercise amount to be performed by a user on a specific date. The communication unit 210 may receive, from an external apparatus, information on a specific date and a goal exercise amount corresponding to the specific date.

The sensing unit 220 may detect acceleration information of the portable electronic apparatus 200. The sensing unit 220 may include a two-axis acceleration sensor or a three-axis acceleration sensor so as to detect a gravitational acceleration. When including a two-axis acceleration sensor, the sensing unit 220 may detect accelerations in XY axes directions to output the detected accelerations to the controller 230. Alternatively, when including a three-axis acceleration sensor, the sensing unit 220 may detect accelerations in XYZ axes directions to output the detected accelerations to the controller 230.

The controller 230 may measure a progressed exercise amount based on the acceleration information of the portable electronic apparatus 200 input from the sensing unit 220. The controller 230 may acquire time information including an exercise starting time and the current time, from a counter mounted therein or a base station.

In one embodiment, the controller 230 may measure the number of steps from an exercise starting time to the current time by a counter. For instance, the controller 230 may determine a progressed exercise amount by accumulating the number of steps from 0 o'clock to the current time in a unit time of one day. Alternatively, the controller 230 may determine a progressed exercise amount by accumulating the number of steps from 0 o'clock on Monday to the current time in a unit time of one week.

In another embodiment, the controller 230 may store a step detection time in the storage unit 250. For instance, the controller 230 may store information on the number of steps, together with information on time when steps have occurred. In this case, the controller 230 may measure a progressed exercise amount by adding up (totaling up) information recorded in the storage unit 250, periodically or when requested.

The controller 230 may determine whether steps have occurred or not so as to measure a progressed exercise amount. For instance, the controller 230 may determine a gravitational acceleration based on accelerations in two axes directions or three axes directions input from the sensing unit 220. The controller 230 may calculate a gravitational acceleration by comparing a gravitational acceleration when motions of the portable electronic apparatus 200 are not detected, with accelerations in two axes directions or three axes directions extracted from the currently detected motion.

When the calculated gravitational acceleration is more than a threshold value, the controller 230 may determine that steps have occurred. Then, the controller 230 may accumulate the number of steps, or may store the number of steps in the storage unit 250 together with time information.

The controller 230 may acquire information on a goal exercise amount from the exercise scheduling information received through the communication unit 210. The controller 230 may acquire information on a goal exercise amount in correspondence to a measured progressed exercise amount. As one example, the controller 230 may extract a goal exercise amount for one day when a unit time to measure a progressed exercise amount corresponds to one day. As another example, the controller 230 may extract a goal exercise amount for one week when a unit time to measure a progressed exercise amount corresponds to one week.

The controller 230 may compare the extracted goal exercise amount with the measured progressed exercise amount. The controller 230 may compare a progressed exercise amount with a goal exercise amount for a unit time. A comparison result may include a comparison between the goal exercise amount and the progressed exercise amount, information on an exercise amount remaining to reach the goal exercise amount, information on an exercise amount exceeding the goal exercise amount, etc.

The controller 230 may generate a notification message indicating the comparison result. As one example, when the progressed exercise amount has reached the goal exercise amount, the controller 230 may generate a notification message. As another example, when the progressed exercise amount has reached the goal exercise amount by a predetermined ratio (e.g., 25%, 50%, 75% and 100%), the controller 230 may generate a notification message.

Once the notification message has been generated by the controller 230, the output unit 240 may output the generated notification message. Here, the output unit 240 may output the notification message in a visual manner, or in an audible manner, or in a tactile manner. For instance, the output unit 240 output the notification message indicating that the progressed exercise amount has reached the goal exercise amount by a predetermined ratio, in a visual manner through a display, or in an audible manner through a speaker. Alternatively, when the progressed exercise amount has reached the goal exercise amount by a predetermined ratio, the output unit 240 may generate vibration to inform a user of the occurrence of an event. Here, the output unit 240 may inform a user of the occurrence of an event in a visual manner through a display, or in an audible manner through a speaker.

Figure 3:
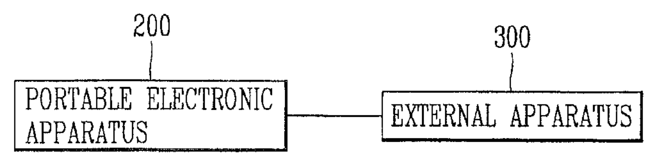
FIG. 3 is a block diagram showing a configuration of an exercise monitoring system according to embodiments of the present invention.

FIG. 3 is a block diagram showing a configuration of an exercise monitoring system according to a first embodiment of the present invention.

As shown in FIG. 3, the exercise monitoring system of one embodiment of the present invention may comprise the portable electronic apparatus 200 and an external apparatus 300.

The portable electronic apparatus 200 may be an apparatus for measuring a status of an object or a user to be detected, and transmitting information on the measured status to an external apparatus 300. The portable electronic apparatus 200 may be an agent device based on a communication standard of an ISO/IEEE 11073 personal health device ('PHD') with respect to health informatics, and the external apparatus 300 may be a manager device based on a communication standard of a PHD.

As one example, the mobile terminal 100 of FIG. 1 may be used as the portable electronic apparatus 200, and a stationary terminal such as a personal computer, a server and a TV may be used as the external apparatus 300. As another example, the mobile terminal 100 of FIG. 1 may be used as the external apparatus 300. In this case, the controller 230 of the portable electronic apparatus 200 may be replaced by the controller 180 of the mobile terminal 100.

The portable electronic apparatus 200 generates information on an exercise amount based on an acceleration signal generated by motions of an object to be measured. Here, the information on an exercise amount may be represented so as to be readable by the external apparatus 300. For instance, the information on an exercise amount may be represented in the form of an ISO/IEEE 11073 Personal Health Device Communication Part 20601 (Application Profile—Optimized Exchange Protocol).

The portable electronic apparatus 200 may perform communications with the external apparatus 300 by a short-range wireless communication method. For instance, the portable electronic apparatus 200 may be provided with a Bluetooth standard-based communication module. In this case, the communication module may be implemented to be based on a Bluetooth Health Device Profile (HDP). Alternatively, the portable electronic apparatus 200 may be provided with a ZigBee standard-based communication module. In this case, the communication module may be implemented to be based on a PHHC (Personal, Home and Hospital Care) profile. Still alternatively, the portable electronic apparatus 200 may be provided with a USB (Universal Serial Bus) standard-based communication module. In this case, the communication module may be implemented to be based on a PHDC (Personal Health Device Class).

The external apparatus 300 may store exercise scheduling information therein, and may transmit the information to the portable electronic apparatus 200. Also, the external apparatus 300 may receive a progressed exercise amount from the portable electronic apparatus 200. The exercise scheduling information and the progressed exercise amount may be periodically transmitted or received between the portable electronic apparatus 200 and the external apparatus 300. As a result, data of the portable electronic apparatus 200 and the external apparatus 300 may be synchronized with each other.

FIG. 4 is a view for explaining exercise scheduling information according to a first embodiment of the present invention.

The exercise scheduling information may include unit time information, and goal exercise amount information corresponding to the unit time information. The unit time information may indicate information on a unit time such as a day, a week, a month and a year. The goal exercise amount information may indicate an exercise amount to be performed by a user for a unit time. This goal exercise amount may be managed as a user drives a scheduler application from the external apparatus. In one embodiment, a user may input a goal exercise amount with respect to a corresponding unit time. Alternatively, the user's trainer may input a goal exercise amount with respect to a corresponding unit time.

The exercise scheduling information may be generated based on physical information including the user's sex, age, height, weight, etc. (e.g., female, 20-year old, 165 cm and 50 kg), exercise plan information including a goal weight, a period, etc. (e.g., 45 kg and three months), additional information including a sleeping time, disease information, a preference exercise, etc. (e.g., 6 hours, hypertension and jogging), dietary information including the user's input (e, g, 1000Kcal/day), etc. The user may input, to the external apparatus 300, the physical information, the exercise plan information, the additional information, the dietary information, etc. Based on the physical information, the exercise plan information, the additional information and the dietary information, exercise scheduling information may be generated according to a preset rule.

Figure 4A:
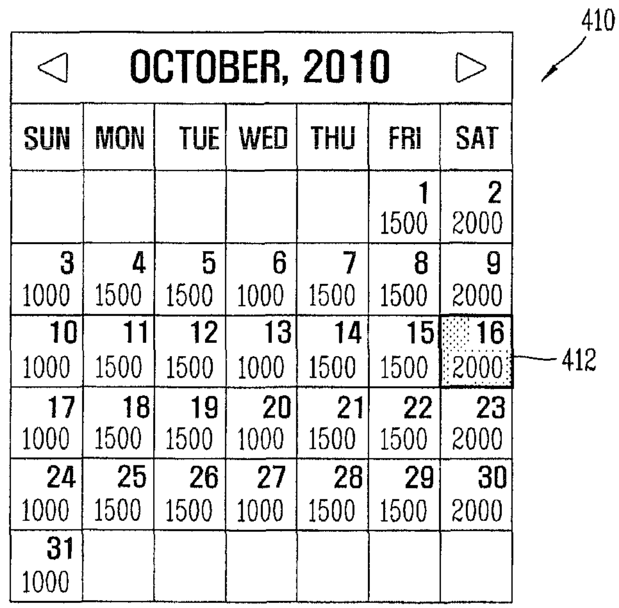
FIG. 4 is a view for explaining exercise scheduling information according to a first embodiment of the present invention.

FIG. 4A is a view showing that the external apparatus 300 displays a goal exercise amount according to a first embodiment of the present invention. The external apparatus 300 provides a menu from which exercise scheduling information can be displayed. Once the menu has been selected, exercise scheduling information 410 generated by the external apparatus 300 is displayed according to each unit time. If the unit time is one day, a goal exercise amount corresponding to each date may be displayed on a calendar-type screen. For instance, a goal exercise amount corresponding to the 16 October is 2000 (kcal).

Figure 4B:
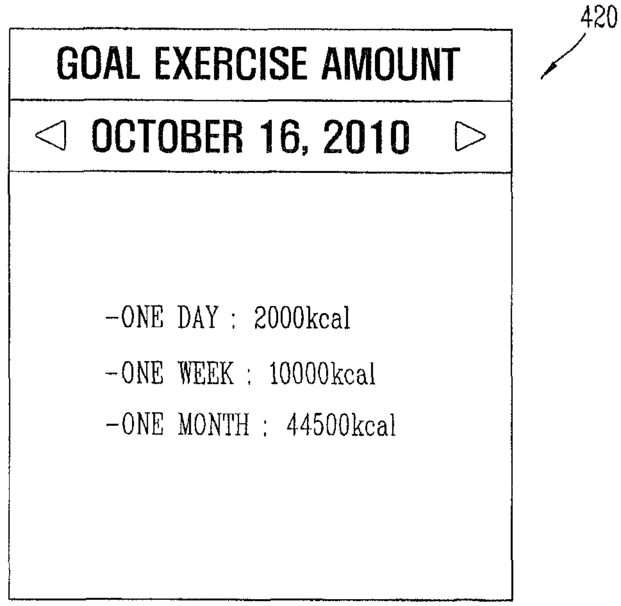

FIG. 4B is a view showing that the external apparatus 300 displays a goal exercise amount in more details according to a first embodiment of the present invention.

Once the specific date 412 has been selected from the exercise scheduling information 410, detailed information 420 on a goal exercise amount corresponding to the selected date is displayed. The detailed information 420 on a goal exercise amount may be implemented according to each unit time in correspondence to a selected date. For instance, a goal exercise amount for one day is 2000 (kcal), a goal exercise amount for one week is 10000 (kcal), and a goal exercise amount for one month is 44500 (kcal).

FIGS. 5 and 6 are views showing a screen for outputting a notification message in the portable electronic apparatus 200 according to a first embodiment of the present invention;

The controller 230 may generate a notification message indicating a comparison result between a goal exercise amount and a progressed exercise amount, and the output unit 240 may output the generated notification message. When the progressed exercise amount has reached the goal exercise amount completely or by a predetermined ratio, the controller 230 may control the output unit 240 to output the notification message.

Referring to FIGS. 5A to 6B, the screens 500, 600 for outputting a notification message may include regions 510, 610 indicating a status of the portable electronic apparatus 200, and regions 520, 620 indicating a comparison result between a goal exercise amount and a progressed exercise amount. On the regions 520, 620 indicating a comparison result, may be displayed information on a goal exercise amount and information on a progressed exercise amount. On the regions 510, 610 indicating a status of the portable electronic apparatus 200, may be displayed an item indicating whether the portable electronic apparatus 200 is in a vibration mode or a sound mode, an item indicating information on a battery of the portable electronic apparatus 200, and an item indicating the current time.

Figure 5A:
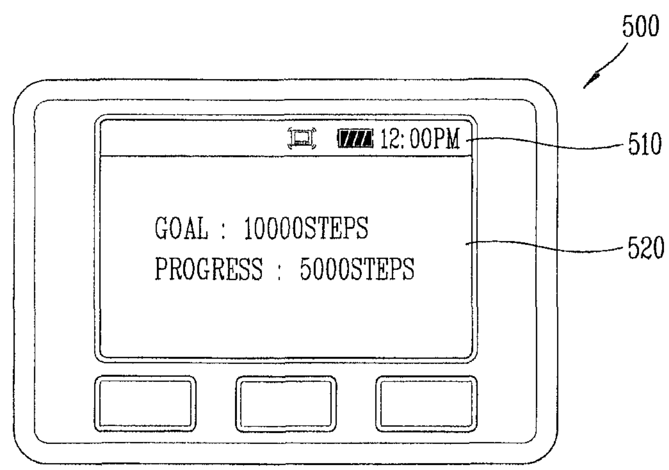
FIG. 5 is a view showing a screen for outputting a notification message in the portable electronic apparatus 200 according to a first embodiment of the present invention.

Referring to FIG. 5A, on the region 520 indicating a comparison result, may be displayed information on a goal exercise amount and information on a progressed exercise amount in the form of the number of steps. The controller 230 may measure the current number of steps, and may control the output unit 240 to output the current number of steps together with a goal number of steps for a unit time.

Figure 5B:
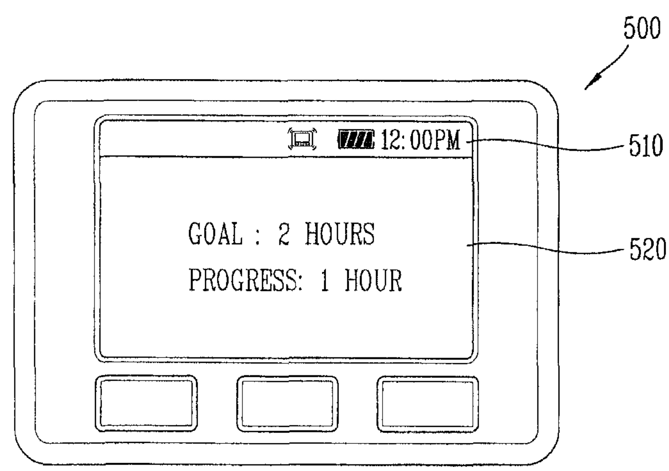

Referring to FIG. 5B, on the region 520 indicating a comparison result, may be displayed information on a goal exercise amount and information on a progressed exercise amount in the form of an exercise time. The controller 230 may measure a progressed exercise time, and may control the output unit 240 to output the progressed exercise time together with a goal exercise time for a unit time. The progressed exercise time may be implemented as the sum of hours for which steps have occurred.

Figure 6A:
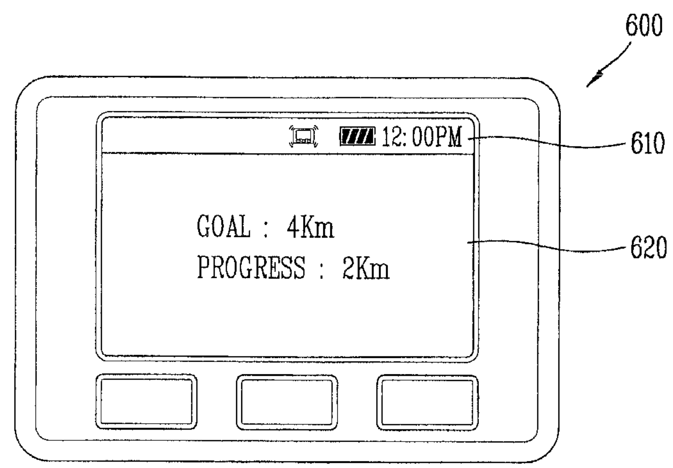
FIG. 6 is a view showing a screen for outputting a notification message in the portable electronic apparatus 200 according to a first embodiment of the present invention.

Referring to FIG. 6A, on a region 620 indicating a comparison result, may be displayed information on a goal exercise amount and information on a progressed exercise amount in the form of an exercise distance. The controller 230 may measure a progressed exercise distance, and may control the output unit 240 to output the progressed exercise distance together with a goal exercise distance for a unit time. The progressed exercise distance may be acquired by multiplying the number of steps by a stride. The stride may be an average stride of users, or a stride input by a specific user.

Figure 6B:
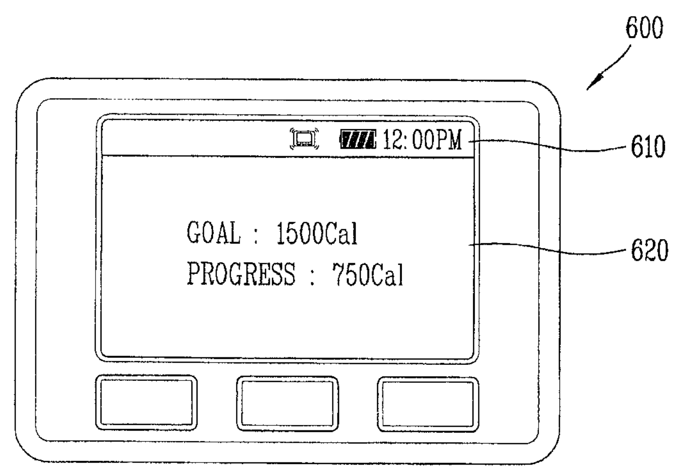

Referring to FIG. 6B, on the region 620 indicating a comparison result, may be displayed information on a goal exercise amount and information on a progressed exercise amount in the form of a calorie-consumption. The controller 230 may measure a progressed calorie-consumption, and may control the output unit 240 to output a progressed calorie-consumption together with a goal calorie-consumption for a unit time. The calorie-consumption may be calculated by various well-known methods. For instance, the calorie-consumption may be calculated by multiplying a standard calorie-consumption per unit time corresponding to an exercise speed, by an exercise time. When referring to the standard calorie-consumption per unit time, the user's weight, etc. may be further considered.

FIG. 7 is a view for explaining a method for calculating a calorie-consumption by the controller 230 according to a first embodiment of the present invention.

Figure 7A:
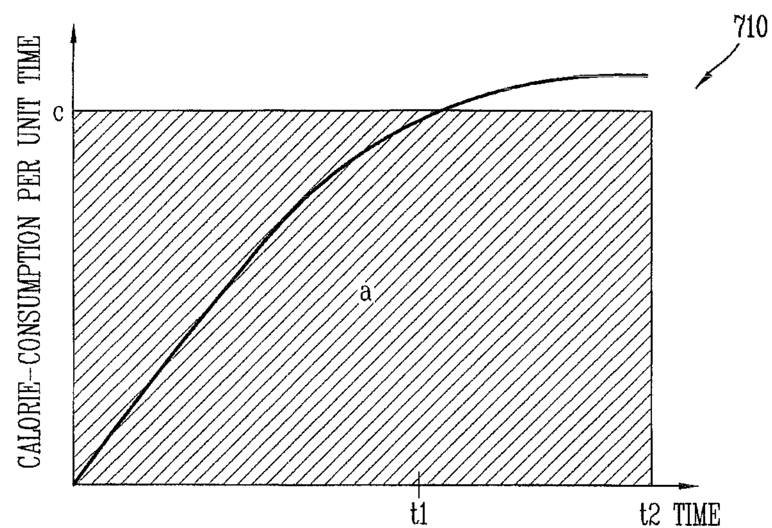
FIG. 7 is a view for explaining a method for calculating a calorie-consumption by a controller 230 according to a first embodiment of the present invention.

Referring to FIG. 7A, a calorie consumed by a user through exercise is represented as a graph 710. Once the user starts exercise, the calorie-consumption per unit time gradually increases. If the exercise time reaches 't1', a value converged to 'c' is acquired. Accordingly, the calorie-consumption may correspond to 'a' acquired by multiplying 't' by 'c'.

Figure 7B:
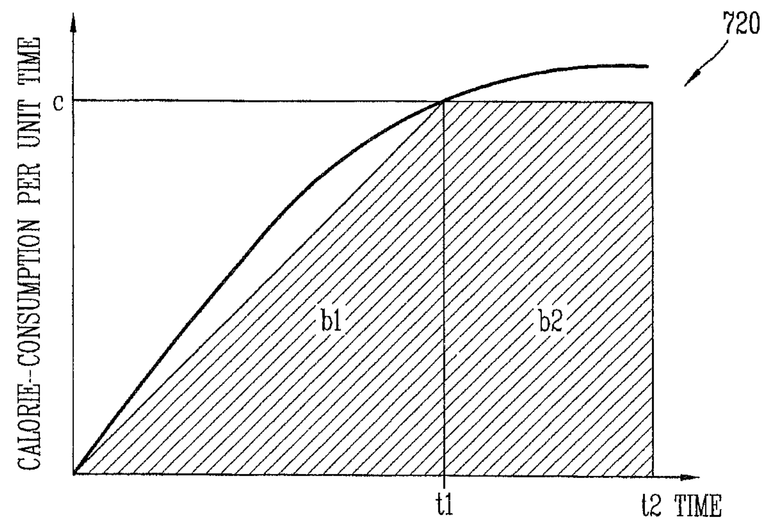

Referring to FIG. 7B, a calorie consumed by a user through exercise is represented as a graph 720. The controller 230 calculates an area of 'b1' corresponding to 't1' after the user has started exercise, and calculates an area of 'b2' corresponding to 't2–t1'. Then, the controller 230 may acquire a calorie-consumption by adding the 'b1' and 'b2' to each other.

Here, the 't1' may be experimentally determined, or may be previously measured with respect to the user. In the first embodiment, the 't1' may be 3 minutes. Under this configuration, the controller 230 may calculate the calorie-consumption more precisely.

FIG. 8 is a view showing a screen for outputting a notification message in a portable electronic apparatus 200 according to a second embodiment of the present invention.

The controller 230 may calculate information on an exercise amount necessary for a progressed exercise amount to reach a goal exercise amount. The output unit 240 may output the calculated information. The controller 230 may generate guide information including an exercise type and an exercise time based on the calculated information. And, the output unit 240 may output the generated guide information.

Figure 8A:
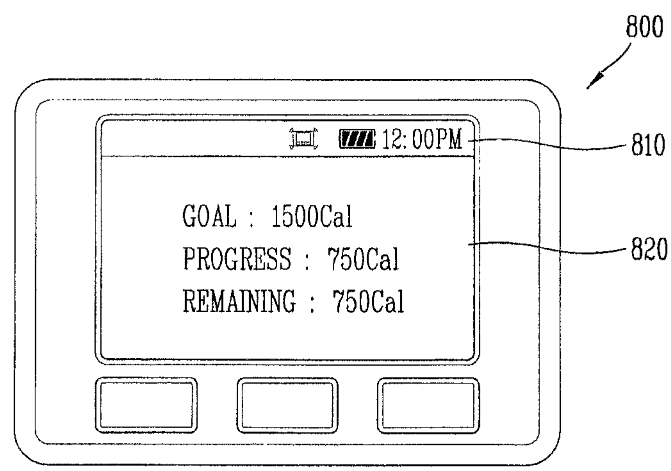
FIG. 8 is a view showing a screen for outputting a notification message in a portable electronic apparatus 200 according to a second embodiment of the present invention.
Figure 8B:
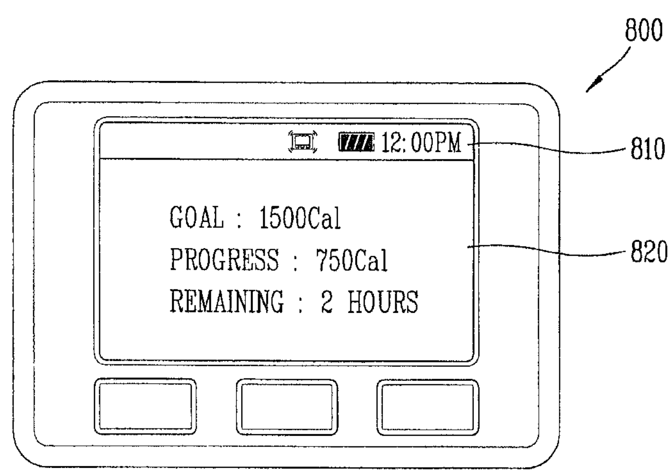

Referring to FIGS. 8A and 8B, a screen 800 for outputting a notification message may include a region 810 indicating a status of the portable electronic apparatus 200, and a region 820 indicating a comparison result between a goal exercise amount and a progressed exercise amount. On the region 820 indicating a comparison result, may be displayed information on a goal exercise amount and information on a progressed exercise amount. On the region 810 indicating a status of the portable electronic apparatus 200, may be displayed an item indicating whether the portable electronic apparatus 200 is in a vibration mode or a sound mode, an item indicating information on a battery of the portable electronic apparatus 200, and an item indicating the current time.

Referring to FIG. 8A, on the region 820 indicating a comparison result, may be displayed information on a remaining exercise amount in the same manner as information on a goal exercise amount and information on a progressed exercise amount. The controller 230 may calculate the remaining exercise amount based on a difference between the goal exercise amount and the progressed exercise amount. For instance, when the goal exercise amount and the progressed exercise amount are displayed in the form of a calorie-consumption, the controller 230 may calculate the remaining exercise amount in the form of a calorie-consumption. And, the output unit 240 may display the remaining calorie-consumption on the region 820 indicating a comparison result.

Referring to FIG. 8B, on the region 820 indicating a comparison result, may be displayed the remaining exercise amount in a different manner from the goal exercise amount and the progressed exercise amount. The controller 230 may calculate the remaining exercise amount based on a difference between the goal exercise amount and the progressed exercise amount. For instance, when the goal exercise amount and the progressed exercise amount are displayed in the form of calorie-consumption, the controller 230 may calculate the remaining exercise amount in the form of an exercise time. The controller 230 may firstly calculate a remaining calorie-consumption, and then calculate the current exercise speed. Then, the controller 230 may calculate time taken to consume the remaining calorie-consumption with the current exercise speed. And, the output unit 240 may display the remaining exercise time on the region 820 indicating a comparison result.

On the region 820 indicating a comparison result, may be displayed guide information on a remaining exercise amount together with a goal exercise amount and a progressed exercise amount. The controller 230 may generate the guide information based on a difference between the goal exercise amount and the progressed exercise amount. For instance, when the goal exercise amount and the progressed exercise amount are displayed in the form of a calorie-consumption, the controller 230 may calculate the remaining exercise amount in the form of an exercise time. The controller 230 may firstly calculate a remaining calorie-consumption, and then calculate time taken to consume the remaining calorie-consumption with a speed corresponding to each exercise type. And, the output unit 240 may display the guide information including an exercise type and an exercise time on the region 820 indicating a comparison result.

FIG. 9 is a view showing a screen for outputting a notification message in a portable electronic apparatus 200 according to a third embodiment of the present invention.

The controller 230 may calculate an exercise speed based on acceleration information input from the sensing unit 220. The controller 230 may determine an exercise level based on the calculated exercise speed, and the output unit 240 may output the determined exercise level. When the determined exercise level is constantly maintained for a predetermined time, the controller 230 may generate a message recommending a change of the exercise level, and the output unit 240 may output the generated message.

Figure 9A:
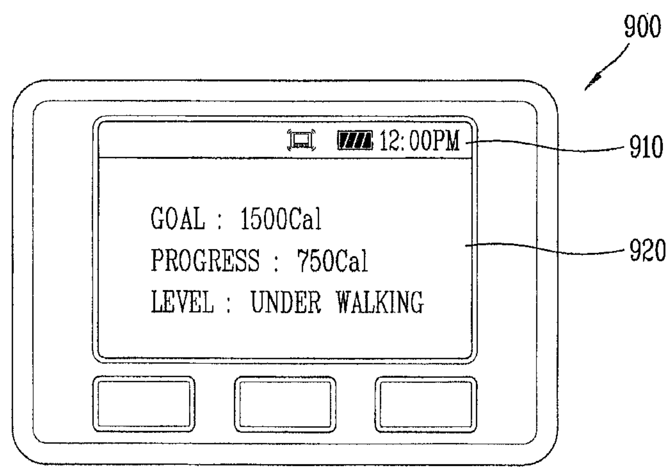
FIG. 9 is a view showing a screen for outputting a notification message in a portable electronic apparatus 200 according to a third embodiment of the present invention.
Figure 9B:
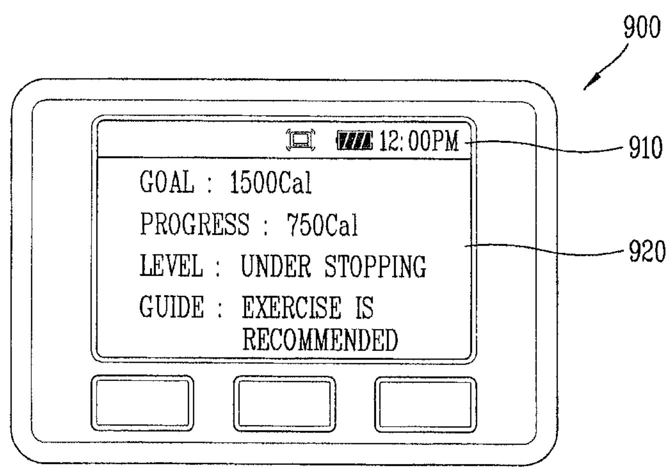

Referring to FIGS. 9A and 9B, a screen 900 for outputting a notification message may include a region 910 indicating a status of the portable electronic apparatus 200, and a region 920 indicating a comparison result between a goal exercise amount and a progressed exercise amount. On the region 920 indicating a comparison result, may be displayed information on a goal exercise amount, information on a progressed exercise amount, and information on an exercise level. On the region 910 indicating a status of the portable electronic apparatus 200, may be displayed an item indicating whether the portable electronic apparatus 200 is in a vibration mode or a sound mode, an item indicating information on a battery of the portable electronic apparatus 200, and an item indicating the current time.

Referring to FIG. 9A, on the region 920 indicating a comparison result, may be displayed an exercise level together with a goal exercise amount and a progressed exercise amount. The controller 230 may calculate the current exercise speed, and may determine an exercise level corresponding to the current exercise speed. For instance, the storage unit 250 may store information on exercise speeds corresponding to exercise levels. The controller 230 may determine an exercise level corresponding to the current exercise speed based on the stored information. And, the output unit 240 may display the determined exercise level on the region 920 indicating a comparison result.

Referring to FIG. 9B, on the region 920 indicating a comparison result, may be displayed an exercise level and a message recommending a change of the exercise level, together with a goal exercise amount and a progressed exercise amount. The controller 230 may monitor a time duration for which the current exercise level has been maintained, and may generate a message recommending a change of the exercise level when the exercise level has been constantly maintained for a time more than a threshold value. For instance, the storage unit 250 may store a message recommending a change of the exercise level which has been constantly maintained for a time more than a threshold value. The controller 230 may read the message recommending a change of the exercise level which has been constantly maintained for a time more than a threshold value. And, the output unit 240 may display the read recommendation message on the region 920 indicating a comparison result.

FIG. 10 is a view for explaining exercise scheduling information and a progressed exercise amount according to one embodiment of the present invention.

The portable electronic apparatus 200 and the external apparatus 300 may transmit or receive exercise scheduling information and a progressed exercise amount with a predetermined period. As a result, the exercise scheduling information stored in the external apparatus 300 and the progressed exercise amount stored in the portable electronic apparatus 200 may be synchronized with each other with a predetermined period.

Figure 10A:
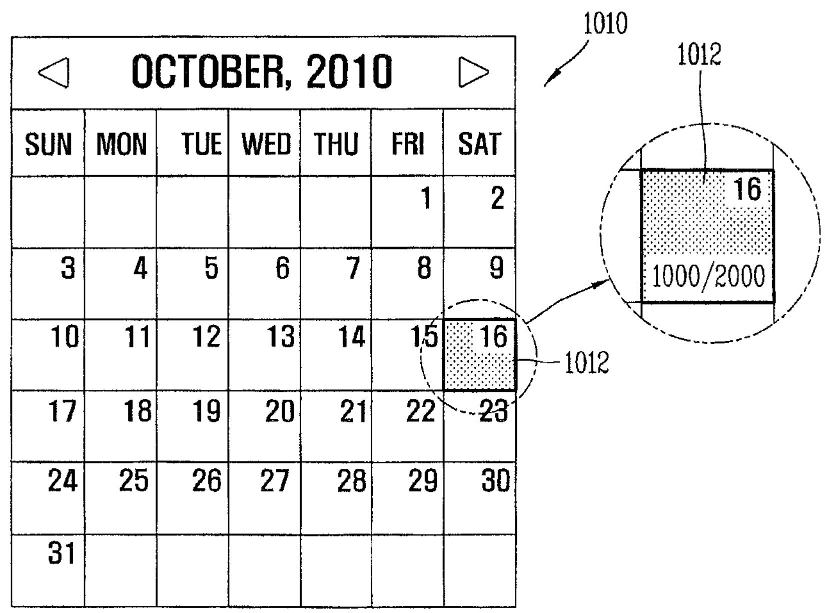
FIG. 10 is a view for explaining exercise scheduling information and a progressed exercise amount according to one embodiment of the present invention.

FIG. 10A is a view showing that the external apparatus 300 displays a goal exercise amount and a progressed exercise amount according to a first embodiment of the present invention.

The external apparatus 300 provides a menu from which exercise scheduling information can be displayed. Once the menu has been selected, exercise scheduling information 1010 generated by the external apparatus 300 is displayed according to each unit time. If the unit time is one day, a goal exercise amount and a progressed exercise amount corresponding to each date may be displayed on a calendar-type screen. For instance, a specific item 1012 corresponding to the 16 October displays a goal exercise amount of 2000 kcal and a progressed exercise amount of 1000 kcal.

Figure 10B:
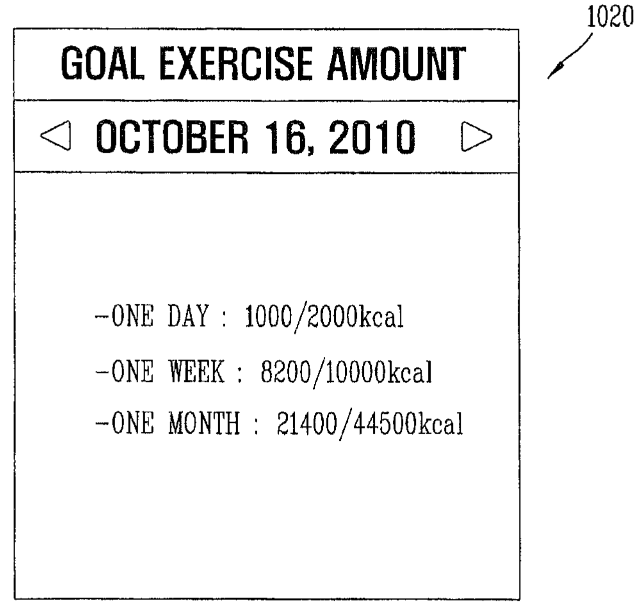

FIG. 10B is a view showing that the external apparatus 300 displays a progressed exercise amount in more details according to one embodiment of the present invention.

Once the specific item 1012 has been selected from the exercise scheduling information 1010, detailed information 1020 on a goal exercise amount and a progressed exercise amount corresponding to the selected date is displayed. The detailed information 1020 on a goal exercise amount and a progressed exercise amount may be implemented according to each unit time in correspondence to a selected date. For instance, a goal exercise amount for one day is 2000 (kcal), and a progressed exercise amount for one day is 1000 (kcal). A goal exercise amount for one week is 10000 (kcal), and a progressed exercise amount for one week is 8200 (kcal). And, a goal exercise for one month is 44500 (kcal), and a progressed exercise amount for one month is 21400 (kcal).

Figure 11:
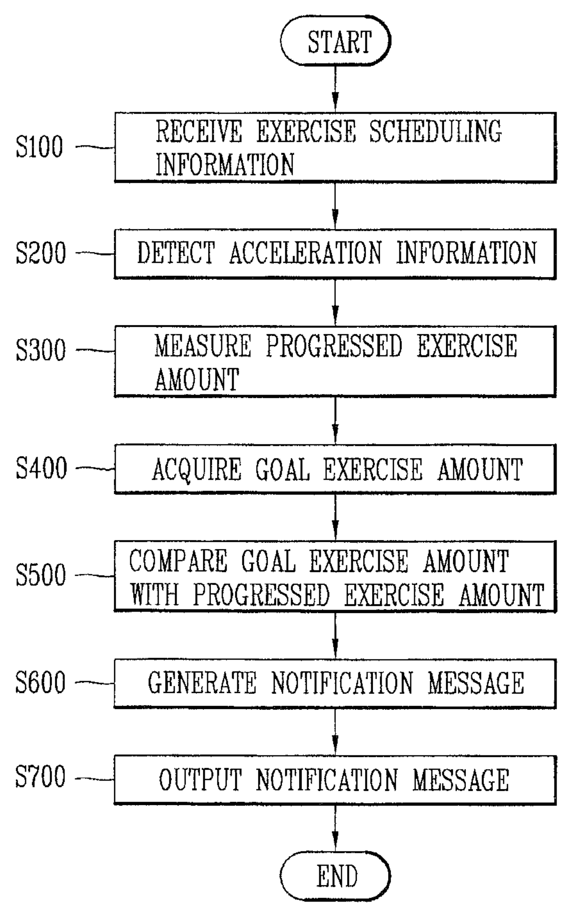
FIG. 11 is a flowchart showing exercise monitoring processes according to one embodiment of the present invention.

FIG. 11 is a flowchart showing exercise monitoring processes according to a first embodiment of the present invention.

The communication unit 210 may receive exercise scheduling information from the external apparatus (S100). For instance, the communication unit 210 may receive, from the external apparatus 300, information on a unit time and a corresponding goal exercise amount.

The sensing unit 220 may detect acceleration information of the portable electronic apparatus 200 (S200). When the sensing unit 220 includes a two-axis acceleration sensor, the sensing unit 220 may detect accelerations in XY axes directions to output the detected accelerations to the controller 230. Alternatively, when the sensing unit 220 includes a three-axis acceleration sensor, the sensing unit 220 may detect accelerations in XYZ axes directions to output the detected accelerations to the controller 230.

The controller 230 may measure a progressed exercise amount based on the acceleration information of the portable electronic apparatus 200 input from the sensing unit 220 (S300). The controller 230 may acquire time information including an exercise starting time and the current time, from a counter mounted therein or a base station. In one embodiment, the controller 230 may measure the number of steps from an exercise starting time to the current time by a counter. In another embodiment, when steps have been detected, the controller 230 may store a step detection time in the storage unit 250. The controller 230 may calculate the number of steps so as to measure a progressed exercise amount. For instance, the controller 230 may calculate a gravitational acceleration based on accelerations in two axes directions or three axes directions input from the sensing unit 220. When the calculated gravitational acceleration is more than a threshold value, the controller 230 may determine that steps have occurred. Then, the controller 230 may accumulate the number of steps, or may store the number of steps in the storage unit 250 together with time information.

The controller 230 may acquire information on a goal exercise amount from the exercise scheduling information received through the communication unit 210 (S400). The controller 230 may acquire information on a goal exercise amount corresponding to a measured progressed exercise amount for a unit time.

The controller 230 may compare the acquired goal exercise amount with the measured progressed exercise amount (S500). The controller 230 may compare a progressed exercise amount with a goal exercise amount for a unit time. A comparison result may include a comparison between the goal exercise amount and the progressed exercise amount, information on an exercise amount remaining to reach the goal exercise amount, information on an exercise amount exceeding the goal exercise amount, etc.

The controller 230 may generate a notification message indicating the comparison result (S600). As one example, when the progressed exercise amount has reached the goal exercise amount, the controller 230 may generate a notification message. As another example, when the progressed exercise amount has reached the goal exercise amount by a predetermined ratio, the controller 230 may generate a notification message.

Once the notification message has been generated by the controller 230, the output unit 240 may output the generated notification message (S700). Here, the output unit 240 may output the notification message in a visual manner, or in an audible manner, or in a tactile manner.

Figure 12:
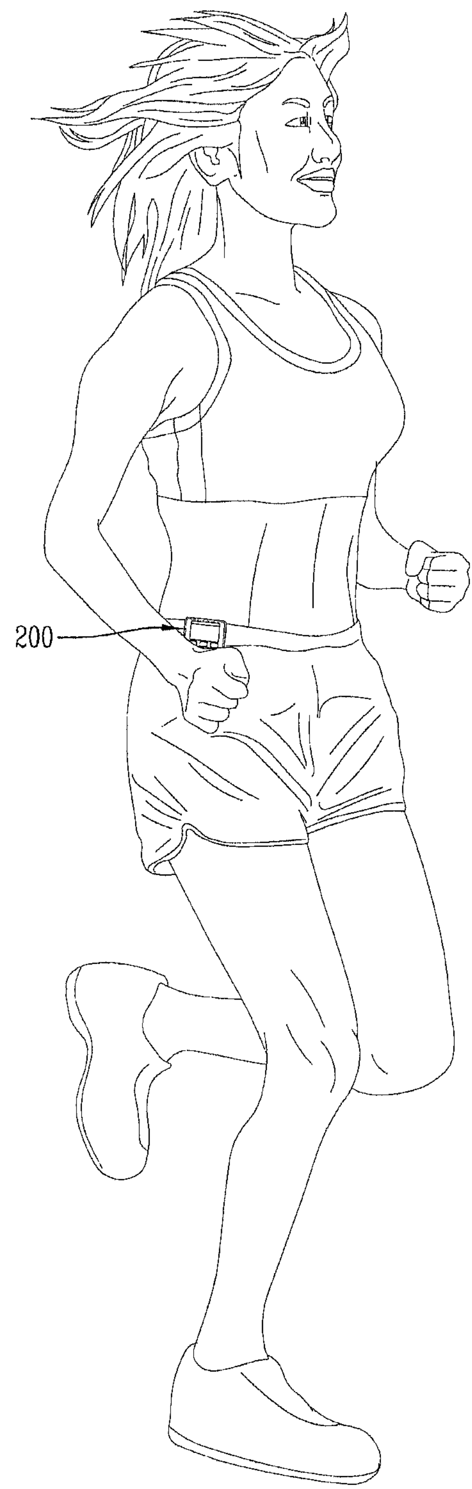
Figure 13:
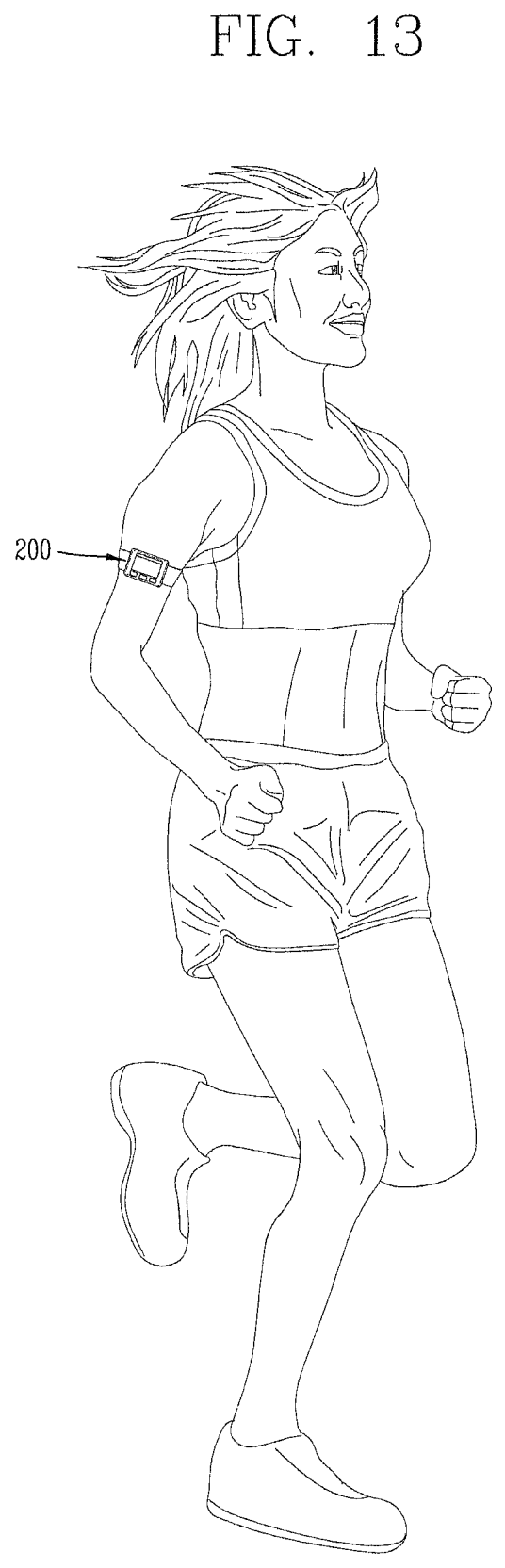
Figure 14:
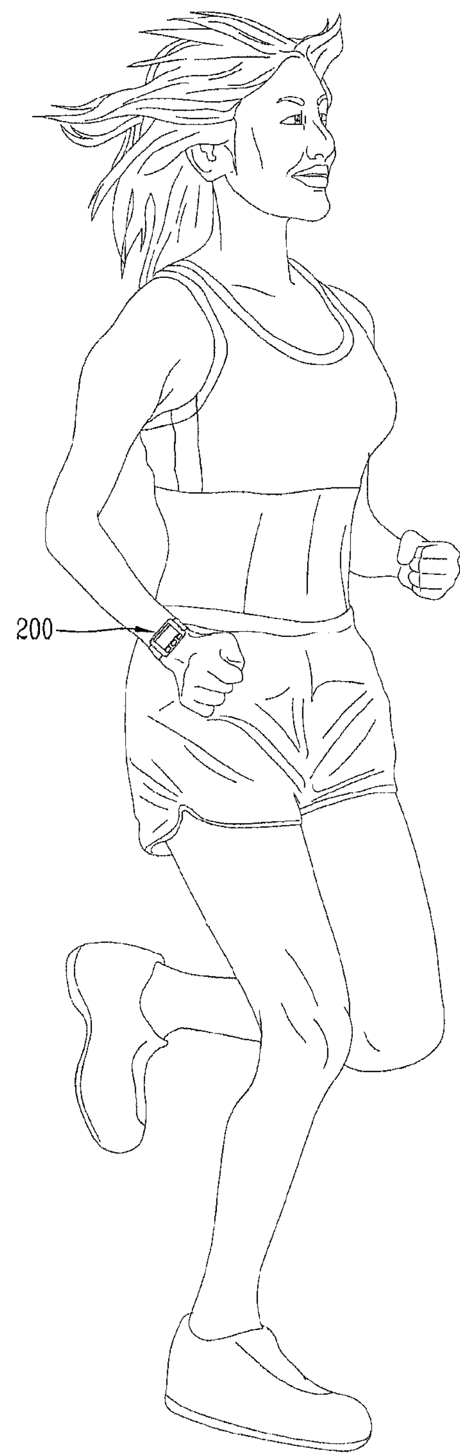

FIGS. 12 to 14 are conceptual views showing examples to mount the portable electronic apparatus 200 according to one embodiment of the present invention. The exercise electronic apparatus 200 may have a shape suitable for being mounted to a human's body or clothes.

Referring to FIG. 12, the portable electronic apparatus 200 may be a clip type attachable to a belt mounted onto a user's waist. The portable electronic apparatus 200 may detect a gravitational acceleration by motions of the user's waist according to the user's walking or running. Based on this acceleration, the portable electronic apparatus 200 may measure an exercise amount.

Referring to FIG. 13, the portable electronic apparatus 200 may be a type attachable to an arm band mounted onto a user's arm. The portable electronic apparatus 200 may detect a gravitational acceleration by motions of the user's arm according to the user's walking or running. Based on this acceleration, the portable electronic apparatus 200 may measure an exercise amount.

Referring to FIG. 14, the portable electronic apparatus 200 may be a type attachable to an wrist band mounted onto a user's wrist. The portable electronic apparatus 200 may detect a gravitational acceleration by motions of the user's wrist according to the user's walking or running. Based on this acceleration, the portable electronic apparatus 200 may measure an exercise amount.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to acquire additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An exercise monitoring apparatus, comprising:

a communication device configured to receive exercise scheduling information from an external apparatus;

a sensor configured to detect acceleration information of the exercise monitoring apparatus;

a controller configured to measure a progressed exercise amount and an exercise speed based on the acceleration information, to acquire a goal exercise amount from the exercise scheduling information, to compare the progressed exercise amount with the goal exercise amount, and to generate a notification message indicating a result of the comparison; and an output device configured to output the notification message, wherein the controller configured to output an alarm message recommending a change of the exercise speed when the exercise speed is satisfied with a predetermined criterion, such that the alarm message provides a notification of the change of the exercise speed for achieving the goal exercise amount.

2. The apparatus of claim 1, wherein the controller controls the output unit device to output information on an exercise amount necessary for the progressed exercise amount to reach the goal exercise amount.

3. The apparatus of claim 2, wherein the controller generates guide information including an exercise type and an exercise time based on the information on the exercise amount necessary for the progressed exercise amount to reach the goal exercise amount, and controls the output device to output the guide information.

4. The apparatus of claim 1, wherein the controller determines an exercise level based on the exercise speed.

5. The apparatus of claim 4, further comprising a memory configured to store exercise level information on exercise speeds corresponding to exercise levels, wherein the controller determines the exercise level based on the exercise speed and the exercise level information.

6. The apparatus of claim 5, wherein the controller controls to output the alarm message if the exercise level is constantly maintained for a predetermined time.

7. The apparatus of claim 4, wherein the alarm message contains at least one of the progressed exercise amount, the goal exercise amount, the exercise speed, the exercise level, a duration of time of the exercise level, a goal exercise level or a message recommending a change of the exercise level.

8. The apparatus of claim 7, wherein the message is varied depending on the exercise level.

9. The apparatus of claim 1, wherein the controller controls the output device to output the notification message when the progressed exercise amount has reached the goal exercise amount completely or by a predetermined ratio.

10. The apparatus of claim 1, wherein the controller generates guide information on an exercise type and an exercise time necessary for the progressed exercise amount to reach the goal exercise amount, and controls the output device to output the guide information.

11. The apparatus of claim 1, wherein the controller controls the communication unit to transmit information on the progressed exercise amount to the external apparatus.

12. The apparatus of claim 1, wherein the communication device synchronizes the exercise scheduling information and the progressed exercise amount, with the external apparatus in a predetermined period.

13. The apparatus of claim 1, wherein the goal exercise amount and the progressed exercise amount comprise the number of steps, an exercise distance, an exercise time and a calorie-consumption.

14. The apparatus of claim 1, wherein the sensor includes at least one acceleration sensor or gyro sensor.

15. The apparatus of claim 1, wherein the exercise monitoring apparatus is mounted to a human body or clothes.

16. The apparatus of claim 1, wherein the output device outputs the notification message in a visual manner, in an audible manner, or in a tactile manner.

17. The apparatus of claim 1, wherein the notification message contains at least one of the progressed exercise amount, the goal exercise amount or a ratio of the progressed exercise amount to the goal exercise amount.

18. The apparatus of claim 17, wherein the controller configured to output the notification message when the progressed exercise amount has reached the goal exercise amount by a predetermined ratio.

19. The apparatus of claim 17, wherein the output device configured to output the notification message in at least one of a visual manner, an audible manner or a tactile manner.

20. The apparatus of claim 17, wherein the progressed exercise amount and the goal exercise amount are displayed in the form of at least one of number of steps, an exercise time, an exercise distance or a calorie-consumption.

21. A controlling method of an exercise monitoring apparatus, the method comprising:

receiving exercise scheduling information from an external apparatus;

detecting acceleration information of the exercise monitoring apparatus;

measuring a progressed exercise amount and an exercise speed based on the acceleration information;

acquiring a goal exercise amount from the exercise scheduling information, comparing the progressed exercise amount with the goal exercise amount;

generating a notification message indicating a result of the comparison;

outputting the notification message; and outputting an alarm message recommending a change of the exercise speed when the exercise speed is satisfied with a predetermined criterion, such that the alarm message provides a notification of the change of the exercise speed for achieving the goal exercise amount.

22. An exercise monitoring system, comprising:

a first apparatus; and a second apparatus, wherein the first apparatus comprises:

a storage configured to store exercise scheduling information; and a communication device configured to transmit the exercise scheduling information to the second apparatus, and wherein the second apparatus comprises:

a communication device configured to receive the exercise scheduling information from the first apparatus;

a sensor configured to detect acceleration information of the second apparatus;

a controller configured to measure a progressed exercise amount and an exercise speed based on the acceleration information, to acquire a goal exercise amount from the exercise scheduling information, to compare the progressed exercise amount with the goal exercise amount, to generate a notification message indicating a result of the comparison, and to generate an alarm message recommending a change of the exercise speed when the exercise speed is satisfied with a predetermined criterion, such that the alarm message provides a notification of the change of the exercise speed for achieving the goal exercise amount; and an output device configured to output at least one of the notification message or the alarm message.

* * * * *